| United States Patent [19] | [11] | 4,121,127 |
|---|---|---|
| Adelski et al. | [45] | Oct. 17, 1978 |

[54] EXTERNAL-ROTOR TYPE DRUM MOTOR

[75] Inventors: Hans-Joachim Adelski, Salz; Wilhelm Gertz, Bad-Neustadt, Saale, both of Fed. Rep. of Germany

[73] Assignee: Siemens Aktiengesellschaft, Berlin and Munich, Fed. Rep. of Germany

[21] Appl. No.: 768,830

[22] Filed: Feb. 15, 1977

[30] Foreign Application Priority Data

Mar. 24, 1976 [DE] Fed. Rep. of Germany ....... 2612537

[51] Int. Cl.[2] .............................................. H02K 7/00
[52] U.S. Cl. .................................... 310/67 R; 310/47; 310/81; 310/211
[58] Field of Search ...................... 310/67, 211, 89, 42

[56] References Cited

U.S. PATENT DOCUMENTS

| 1,980,056 | 11/1934 | Hedeby | 310/67 X |
| 2,682,617 | 6/1954 | Reich et al. | 310/67 |
| 4,032,807 | 6/1977 | Richter | 310/67 X |

*Primary Examiner*—Donovan F. Duggan
*Attorney, Agent, or Firm*—Kenyon & Kenyon, Reilly, Carr & Chapin

[57] ABSTRACT

An external-rotor type drum motor in which the rotor includes axially extending members to which are fastened the respective end bells of the motor. The motor is further provided with a drum cylinder which surrounds the rotor and the end bells and is secured axially by means of a ring which is bolted to one of the end bells and rests against an inner shoulder formed on the drum cylinder.

1 Claim, 1 Drawing Figure

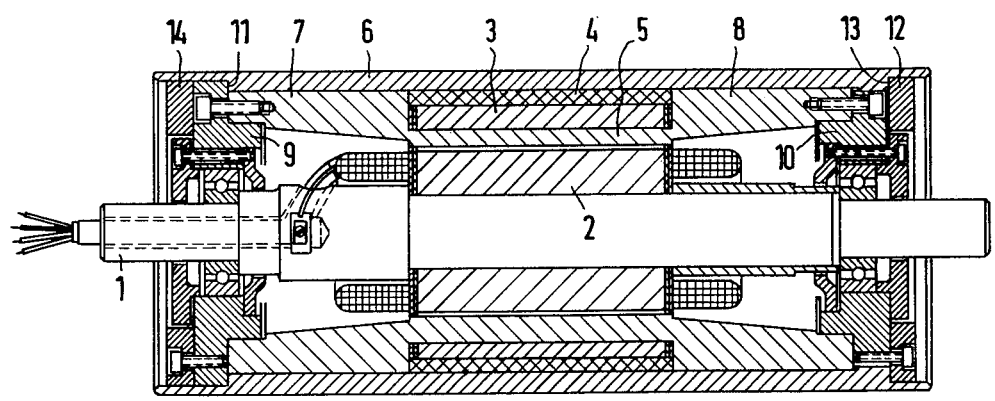

EXTERNAL-ROTOR TYPE DRUM MOTOR

BACKGROUND OF THE INVENTION

1. Field of the Invention

This invention pertains to motors and, in particular to external-rotor type drum motors.

2. Description of the Prior Art

German Offenlegungsschrift 1,448,383 discloses an external-rotor type drum motor in which a drum jacket of steel is drawn around the rotor and serves at the same time as the return yoke of the rotor. The advantage of the aforesaid type of drum motor is that the customary rotor laminations become unnecessary, thereby resulting in a substantial savings in electrical sheet material. Moreover, in the case of drum motors of such type which are permanent-magnet-excited, a significant amount of magnetic material can be accommodated with the same outside diameter as in prior motor constructions.

In the above discussed drum motor, the end bells of the motor are centered and fastened at shoulders of the drum jacket. This presents a disadvantage in that, if it is necessary to exchange or rework the drum, the external rotor must be dismantled completely and must also be centrifuged and balanced when returned to a completely assembled condition.

It is an object of the present invention to provide an external-rotor type drum motor which does not suffer from the aforesaid disadvantage.

SUMMARY OF THE INVENTION

In accordance with the principles of the present invention, the above and other objectives are accomplished in an external rotor-type drum motor of the above type of providing the rotor with members which extend axially in opposite directions and to which the respective end bells of the motor are fastened. The drum cylinder or jacket of the rotor is arranged to surround the rotor as well as the fastened end bells and is itself secured axially by fastening it to at least one of the end bells. The latter is accomplished by means of a ring which is bolted to the one end bell and rests against an inner shoulder of the drum adjacent such bell. Advantageously, the axially entending members of the rotor can be formed from portions of the rotor shorting rings.

With the rotor designed as aforesaid, the drum or jacket advantageously can be removed for exchanging or reworking the drum merely by removing the fastening ring and pulling the drum. Moreover, the motor can be assembled and balanced first without the drum. After the drum is pulled in place and fastened, the entire external-type drum motor can then be centrifuged and balanced.

Instead of only one fastening ring, two such rings may also be provided, one at each end of the motor. Where one ring is employed, it is advantageous to axially secure the drum on the side thereof opposite that secured by the ring by means of an internal drum shoulder which rests against the inner rim of the corresponding end bell. In this manner, correct mounting of the drum is obtained if the drum is put in place from either side.

BRIEF DESCRIPTION OF THE DRAWINGS

The above and other features and aspects of the present invention will become apparent upon reviewing the following detailed description in conjunction with the sole drawing which shows a longitudinal cross section through a motor in accordance with the principles of the present invention.

DETAILED DESCRIPTION

As shown, the motor of the present invention comprises a stationary shaft 1 on which a stator 2 is arranged. The motor further comprises an external rotor which includes the pole pieces 3 and the permanent magnets 4, the latter magnets being arranged outside the pole pieces 3 in the radial direction. The motor is further provided with a shorting cage 5 and with a return yoke in the form of a steel jacket (or cylinder) 6, which surrounds the rotor parts and forms the drum of the motor.

The shorting rings 7 and 8 of the rotor axially extend in opposite directions and have bolted to them the end bells 9 and 10, respectively, of the motor. In this manner, the motor can first be assembled and balanced without the drum and thereafter, the drum 6 may be pushed in place from the right to the left, looking at the plane of the drawing. Advantageously, in the embodiment shown, the drum 6 is provided with an internal shoulder 11 which comes to rest against the inner rim of the end bell 9, as the drum is pushed into place. To facilitate placement of the drum, the end bell 9 has a diameter somewhat larger than the end bell 10. The drum 6 is secured against axial movement by a ring 12 which is bolted to the end bell 10 and rests against another internal shoulder 13 of the drum.

The motor once assembled, as above-described, can be centrifuged and balanced. For this purpose a further ring 14 is likewise fastened to the end bell 9 on the left side of the motor, the latter ring serving merely for weighting purposes.

What is claimed is:

1. An external-rotor type drum motor comprising:
    a rotor having first and second portions extending axially in opposite directions, said first and second portions forming parts of the shorting ring of said rotor;
    first and second end bells fastened to the ends of said first and second portions, respectively;
    a drum cylinder serving as the return yoke for said rotor, said drum cylinder surrounding said rotor and end bells and having first and second inner shoulders at its ends adjacent said first and second end bells, respectively, said first inner shoulder resting against said first end bell;
    a ring for securing said drum cylinder in the axial direction, said ring being fastened to said second end bell and resting against said second inner shoulder of said drum.

* * * * *